June 28, 1960  H. E. HOLLMANN  2,942,479
POSITION INDICATOR
Filed Jan. 14, 1959  7 Sheets-Sheet 1

INVENTOR.
HANS E. HOLLMANN
BY
ATTORNEY

June 28, 1960

H. E. HOLLMANN 2,942,479

POSITION INDICATOR

Filed Jan. 14, 1959

INVENTOR.
HANS E. HOLLMANN
BY
ATTORNEY

INVENTOR.
HANS E. HOLLMANN
BY

ATTORNEY

June 28, 1960    H. E. HOLLMANN    2,942,479
POSITION INDICATOR
Filed Jan. 14, 1959    7 Sheets-Sheet 6

INVENTOR.
HANS E. HOLLMANN
BY
ATTORNEY

# United States Patent Office 2,942,479
Patented June 28, 1960

2,942,479

POSITION INDICATOR

Hans E. Hollmann, Studio City, Calif., assignor to Dresser Industries, Inc., Dallas, Tex., a corporation of Delaware Filed Jan. 14, 1959, Ser. No. 786,848

20 Claims. (Cl. 74—5.6)

This invention relates to means for indicating the positions of three reference axes fixed in space relative to a moving vehicle, and more particularly to an improved device which can take the place of that called a "stable platform" which is conventionally employed with gyroscopes in inertial guidance systems.

Generally a stable platform is employed to support accelerometers from the outputs of which the spatial position of a vehicle with respect to a fixed set of orthogonal axes may be calculated. This is one use to which the present invention may be put although its scope of applications is by no means limited to this particular one.

Gyro-stabilized platforms of the prior art have several serious disadvantages. In the first place, they are inaccurate due to the precession of the stabilizing gyroscopes. Secondly, they are unreliable because it is necessary to drive a gyro rotor mechanically at relatively high speed. Still further, gyros themselves require a considerable number of expensive component parts and for this reason they are difficult and expensive both to build and to maintain.

The present invention overcomes the above-described and other disadvantages of the prior art by providing a spherical body and means controllable to suspend the body in spaced relation thereto without physical contact therewith. Due to the geometry of the body, i.e., due to the fact that it is spherical in shape, its rotational position cannot be changed by simple rectilinear motion of the suspension means which may, for example, be fixed to a moving vehicle. That is, a unidirectional force of acceleration imparted to the sphere by movement of the vehicle cannot cause any unbalanced torque on the sphere and thereby reorient it because of its physical geometry. Thus, it will always remain in its initial rotational position and may be used in a manner similar to that in which a stable platform is used.

In accordance with the invention, the sphere is suspended or levitated in "mid-air," so to speak, whereby friction between it and the vehicle is substantially eliminated and rotation of it with the vehicle is prevented. In other words, it remains in a stationary rotational although the vehicle may move and/or rotate. Such a suspension system may utilize four electromagnets and inductor coils to detect movement of a ferromagnetic sphere. Electric current flow to the electromagnets may be controlled in response to the inductance of the inductor detection coils to maintain the center of the sphere in a substantially fixed position relative to the electromagnets. In accordance with the invention, current may be supplied to the electromagnets not only in accordance with the change in inductance of the coils, but also in the rate of change of the inductance to provide a damping action.

In the operation of a vehicle having electromagnets attached to it, they may be moved with the vehicle relative to the sphere and tend to cause currents to be induced therein as in an induction motor rotor. In order to eliminate the application of reaction torque to the sphere by the induction motor principle, the ferromagnetic sphere may be made of a material known as "ferrite" having a very high resistance.

However, in accordance with a special feature of the invention, compensation for induction motor type reaction torque may be eliminated by rotating the supporting electromagnets oppositely as the vehicle rotates to cause the electromagnets to remain in a stationary position relative to the sphere. An outstanding advantage of this feature of the invention is that the supporting means for the electromagnets not only prevents induction motor type reaction torque from being applied to the sphere, but they also act as an indicator of the position of the sphere relative to the vehicle. Induction motor type reaction torque may actually be eliminated by using a positioning servo for the electromagnet support means not only responsive to signals proportional to translational movement of the sphere, but also proportional to sphere translation velocity and acceleration so that absolutely no movement of the electromagnets relative to the sphere is permitted. The support means for the electromagnets may conveniently be constructed of three frameworks with three corresponding pairs of gimbals as in the case of conventional support means for stable platforms of the prior art.

In accordance with a special feature, the apparatus of the invention is enclosed in a chamber that may be evacuated. Thus, air may be permitted to exist in the chamber initially and be used as damping means to stabilize the sphere at a starting position for a vehicle. The chamber can then be evacuated before movement of the vehicle to further reduce frictional contact with the sphere on subsequent movement of the vehicle.

Thus, it can be seen that the invention provides substantial improvements over the prior art in that the invention is more accurate because the stationary sphere is not subject to the disadvantage of precession as in gyro stabilized platforms of the prior art. No high speed mechanical movement is required in connection with the position indicator of the invention and it is therefore not unreliable as in the case of gyroscope rotors, which must be driven in the prior art. Still further, the invention contemplates the use of only a few inexpensive components which are easy to build and to maintain.

The invention will be better understood when considered in connection with the following description.

In the accompanying drawings which are to be regarded as merely illustrative.

Figure 1:
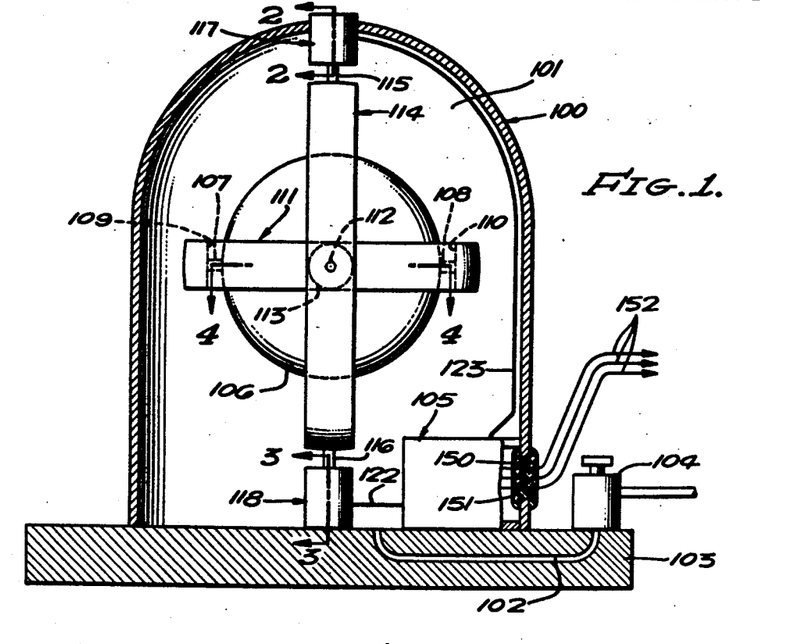
Fig. 1 is a vertical sectional view of the position indicator of the invention.

In Fig. 1, one embodiment of the invention is shown including a housing 100 located on a base 103 providing a chamber 101 which may be evacuated by withdrawing air therefrom through a passageway 102 in base 103 through a valve 104. Valve 104 may be shut off whenever the pressure within chamber 101 is reduced to a desired level.

Figure 4:
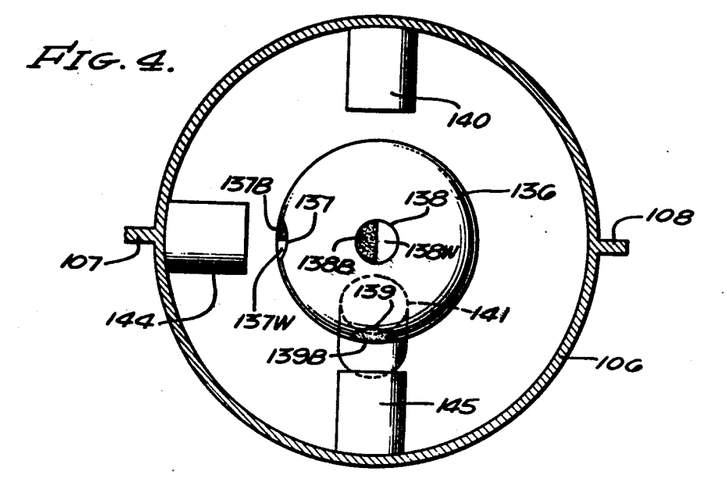
Fig. 4 is a sectional view of a hollow inner supporting sphere shown in Fig. 1.

The position indicator of the invention shown in Fig. 1 is provided with a control circuit generally indicated at 105 for controlling the position of an inner framework or a hollow sphere 106 relative to an internal ferromagnetic sphere 136 shown in Fig. 4 and for controlling the translational position of sphere 136 itself. Sphere 106 is supported on shafts 107 and 108 rotatably mounted in corresponding gimbals 109 and 110 in an intermediate framework 111. Framework 111 is, in turn, rotatably mounted with shafts 112 in corresponding gimbals 113. Gimbals 113 are mounted on an outer framework 114 which is rotatably mounted about the axes of upper and lower shafts 115 and 116 mounted, respectively, in gimbals 117 and 118.

Figures 2, 3:
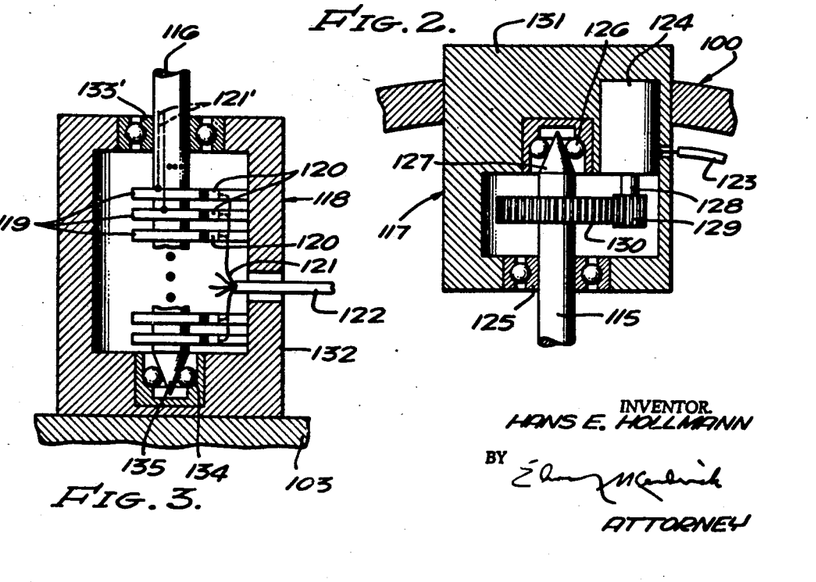
Fig. 2 is an enlarged sectional view taken on the line 2—2 shown in Fig. 1.
Fig. 3 is an enlarged sectional view taken on the line 3—3 shown in Fig. 1.

Control circuit 105 controls a motor 124 shown in upper gimbal 117 in Fig. 2 by means of an electrical connection thereto through a cable 123. Output leads 121 of the electrical apparatus incorporated with the structure supported within chamber 101 are connected to control circuit 105 through a cable 122. The output of control circuit 105 are three electrical leads 152 which pass through a glass seal 151 bonded to the periphery of an aperture 150 in housing 100 shown in Fig. 1. Although the position indicator shown in Fig. 1 may be employed for numerous purposes, it is especially adapted to have accelerometers mounted on inner framework or sphere 106 to produce output signals which may be detected at output leads 152.

As shown in Fig. 3, electrical leads 121 are connected to brushes 120 which frictionally engage slip rings 119. Slip rings 119 are, in turn, fixed to shaft 116 and are connected to electrical leads 121' which may be embedded in shaft 116 but insulated from each other. It is to be understood that all electrical leads within the structure shown between gimbals 117 and 118 are embedded in the physical structure of inner, intermediate and outer frameworks 106, 111 and 114 or within corresponding shafts 107, 108, 112, 115 or 116 connected thereto.

Only a few slip rings 119 have been shown in Fig. 3 for clarity. As many slip rings, of course, may be provided on the lower end of shaft 116 as needed. It is also to be understood that one of each pair of the gimbals 113 and 109, 110 may be substantially identical with that shown in Fig. 3 with the exception that the number of slip rings 119 may be varied. The same is true of the other of the gimbals of pairs 113 and 109, 110 as regards Fig. 2.

As shown in Fig. 2, gimbal 117 includes a housing 131 to retain motor 124 which is provided with an output shaft 128 having a pinion 129 keyed thereto. Pinion 129 engages a gear 130 which is keyed to shaft 115. Shaft 115 is in turn journaled in a bearing 125 and is provided with a conical surface 127 to fit in a thrust bearing 126.

As shown in Fig. 3, shaft 116 is similarly journaled in a bearing 133 and is provided with a conical surface 135 at its lower end journaled in a thrust bearing 134, a housing 132 being provided for gimbal 118 as before.

In Fig. 4, ferromagnetic sphere 136 which may be made of a material called ferrite to provide both a high resistance and a highly permeable body, is provided with spots 137, 138 and 139 thereon having black and white areas 137B, 137W, 138B, 138W and 139B, 139W, respectively. These black and white areas are located at 90 degrees with respect to each other taken in three orthogonal planes through the center of sphere 136. As will be explained hereinafter, the painted areas 137, 138 and 139 permit sphere 106 to be positioned by servo means with exactly the same rotational orientation as sphere 136. It is to be noted that in accordance with the invention, sphere 136 remains absolutely stationary and thus if inner framework 106 does not move with respect to sphere 136, the position of inner framework 106 relative to housing 100 will be indicative of the orientation of any predetermined orthogonal reference axes fixed in space relative to the housing 100 or to the airborne or space vehicle to which it is attached.

Figure 5:
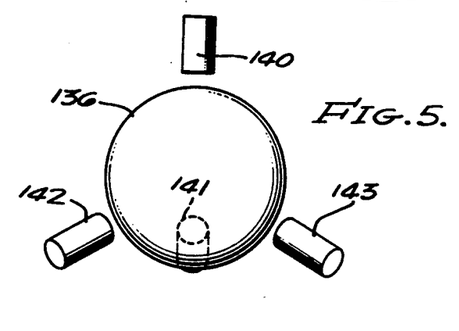
Fig. 5 is a front elevational view of a ferromagnetic sphere with electromagnets shown disposed therearound to maintain it in a "mid-air" position in spaced relation with the electromagnets without physical contact therewith.
Figure 6:
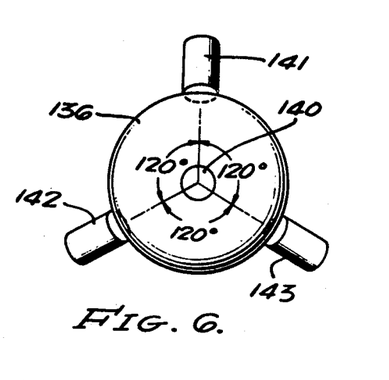
Fig. 6 is a plan view of the arrangement shown in Fig. 5.
Figure 7:
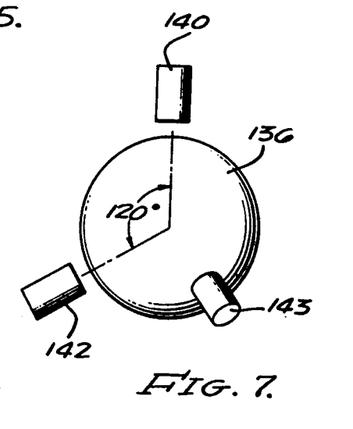
Fig. 7 is a side elevational view of the arrangement shown in Fig. 5.

The translational position of sphere 136 relative to housing 100 is maintained absolutely fixed although its rotational position may be maintained fixed with respect to space while housing 100 rotates in any direction. Support means are provided for sphere 136 including magnetic field producing means 140, 141, 142 and 143. All four of the magnetic field producing means are best shown in Figs. 5 and 6. It is to be noted that all of these are fixed to inner framework or sphere 106. The exact orientation of the magnetic field supporting means is perhaps best illustrated in Figs. 6 and 7. It is to be noted that the projection of axes of magnetic field producing means 141, 142 and 143 in a plane perpendicular to the symmetrical axis of magnetic field producing means 140 will lie 120 degrees apart. Still further, in a plane through the symmetrical axis of magnetic field producing means 140 and a symmetrical axis of any one of the other remaining magnetic field producing means, such as magnetic field producing means 142 shown in Fig. 7, the symmetrical axes of magnetic field producing means 140 and 142 will lie 120 degrees apart.

Although the particular magnetic field producing means to support the ferromagnetic sphere 136 shown in Fig. 4 is substantially different from prior art arrangements, the concept of supporting or levitating a magnetic body in "mid-air" relation, so to speak, between two magnetic field producing means, of course, is not unknown in this art. Such is shown in U.S. Patent Nos. 2,856,238, 2,856,239 and 2,856,240. However, these patents do not disclose any apparatus for performing the function of the invention as a three dimensional indicator. All of these patents require at least double gimbal supports for at least two disc-shaped rotors and two resolvers to perform the function of the present invention. If resolvers were not used, double gimbal supports for a third rotor would be required.

Figure 8:
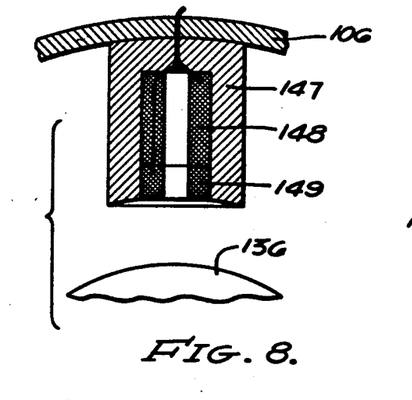
Fig. 8 is a sectional view of one of the supporting electromagnets which is employed with the position indicator of the invention.

Also shown in Fig. 4 are two rotational position detector means 144 and 145. Actually, an additional rotational position detector means is also employed as indicated at 146 shown in Fig. 9 located over spot 138 on sphere 136. Similarly, position detector means 144 and 145 are located over spots 137 and 139, respectively. All the magnetic field producing means may be identical to that indicated in Fig. 8 including a ferromagnetic pole piece 147 containing an electromagnet 148 and a magnetic detector coil 149.

Figure 10:
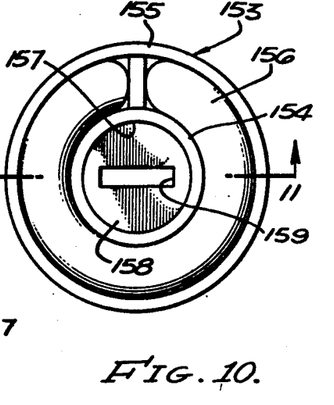
Fig. 10 is a plan view of the detection means shown in Fig. 9.

Each of the rotational position detector means 144, 145 and 146 may be constructed in a manner identical to that shown in Fig. 10 including housing 153 having a fluorescent lamp 156 located in an annular slot 156' between outer and inner flanges 155 and 154, respectively. Housing 153 is provided with an inner bore 157 in which a diaphragm 158 having a rectangular slot 159 is positioned.

Figure 11:
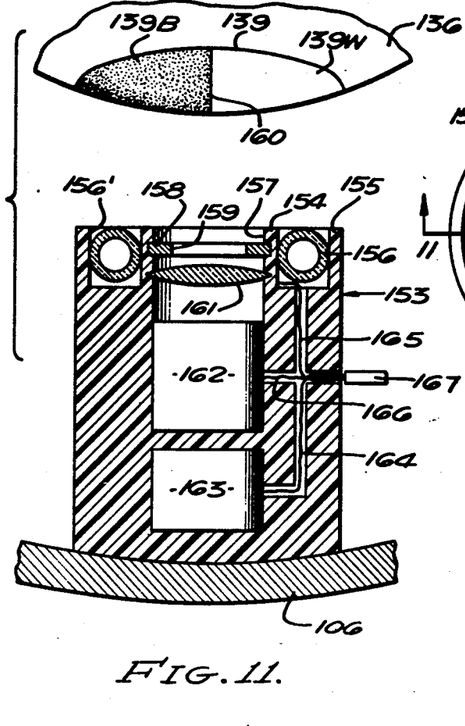
Fig. 11 is a sectional view of the detection means taken on the line 11—11 shown in Fig. 10.

As shown in Fig. 11, a lens 161 is positioned directly below diaphragm 158 and a photocell 162 is positioned directly below lens 161. An accelerometer 163 is also positioned in housing 153 but does not have anything to do with the operation of the detector, and is simply mounted therein for convenience. It is to be noted that a dividing line 160 located between black and white areas 139B and 139W is positioned approximately at the center of slot 139. Hence, the electrical output of photocell 162 will be directly proportional to the rotational position of sphere 136 about an axis through its center perpendicular to the paper as shown in Fig. 11. An electrical output lead is provided from accelerometer 163 at 164. A similar output lead 166 is provided at the output of photocell 162 and an input lead to lamp 156 is provided at 165. All the leads are incorporated in a cable 167 shown in Fig. 11. As shown in Fig. 11, housing 153 is also fixed to sphere 106 as is pole piece 147 shown in Fig. 8.

Figure 12:
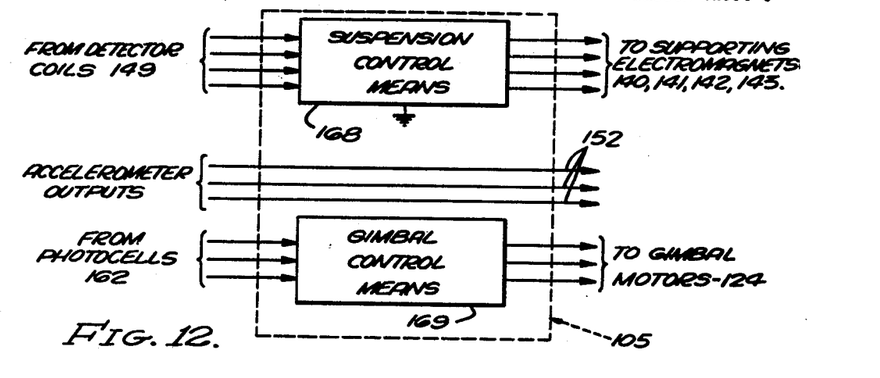
Fig. 12 is a block diagram of a control circuit which may be employed to operate the position indicator shown in Fig. 1.

Control circuit 105 shown in Fig. 1 may include two separate control means, suspension control means 168 and gimbal control means 169 shown in Fig. 12. As shown, the accelerator inputs to control circuit 105 are simply passed therethrough and contain only output leads 152. Inputs are provided to suspension control means 168 from detector coils 145 in magnetic field producing means 140, 141, 142 and 143. The outputs of suspension control means 168 are then impressed upon the supporting electromagnets in the field producing means corresponding to the electromagnet 148 shown in Fig. 8.

Inputs to gimbal control means 169 are provided from outputs of photocells in position detector means 144, 145 and 146. The outputs of gimbal control means 169 are then impressed upon gimbal motors 124 located in corresponding gimbal 117 and corresponding ones of gimbals 113, 109 and 110.

In the operation of the embodiment of the invention shown in Fig. 1, sphere 106 is always maintained in the same position as sphere 136 because any error in the position of sphere 106 from the position of sphere 136 is detected by photocells 162 and gimbal control means in turn rotate corresponding intermediate or outer frameworks 106, 111 or 114 to maintain a substantial alignment of the symmetrical axes of sphere 106 with the position of spots 137, 138 and 139 on sphere 136.

Figure 13:
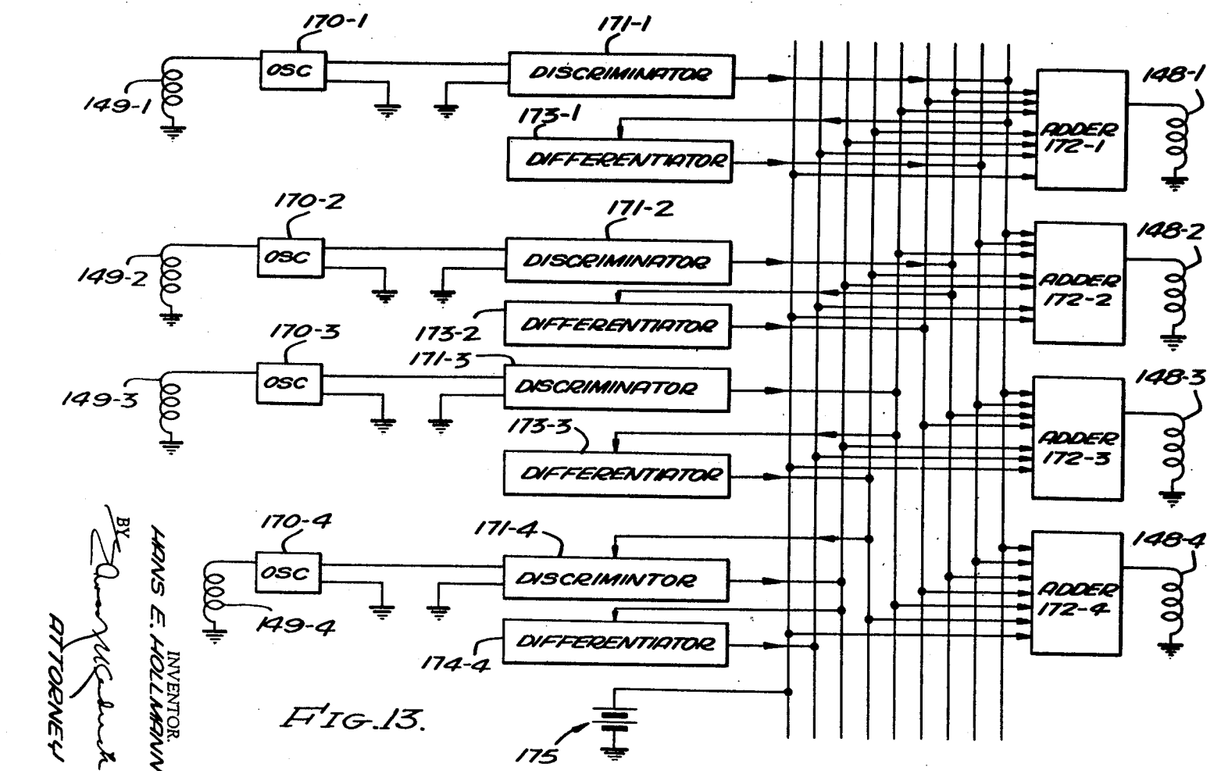
Fig. 13 is a schematic diagram of one of the blocks shown in Fig. 12.

Suspension control means 168 simply maintain the center of sphere 136 at the symmetrical center of sphere 106. One embodiment of suspension control means 168 is shown in Fig. 13. Suspension coils 149 for each of the magnetic field producing means 140, 141, 142 and 143 and 144 are indicated at 149-1, 149-2, 149-3 and 149-4, respectively. Control means for each of the corresponding electromagnets 148 in corresponding magnetic field producing means are given the same −1, −2, et cetera, notation as are a plurality of four oscillators 170, four discriminators 171, four differentiators 173, and four adders 172.

Each electromagnet 148 is controlled by the summation of movement detected by three other corresponding detectors. For example, current is supplied to electromagnet 148-1 by means of the outputs of discriminators and differentiators corresponding to detector coils 149-2, 149-3 and 149-4. The connections of only electromagnets 148-1 and 148-2 will be described since the connections for control of current through electromagnets 148-3 and 148-4 will be exactly analogous.

A direct-current source of potential 175 is employed to impress a constant direct-current voltage upon all adders 172. Adder 172-1 adds this input to the output of discriminators 171-2, 171-3, 171-4 and differentiators 173-2, 173-3 and 173-4. Inputs to discriminators 171-2, 171-3 and 171-4 are provided at the output of corresponding oscillators 170-2, 170-3, and 170-4. The oscillators 170 are variable frequency oscillators which include corresponding detector coils 149 in their tank circuits. The oscillation frequency of oscillators 170 is changed by the change of impedance of detector coils 149 by movement of ferromagnetic sphere 136 toward or away from these coils. Differentiators 173-2, 173-3 and 173-4 are connected from the outputs of corresponding discriminators 171-2, 171-3 and 171-4. The differentiators 173 are employed to compensate for mechanical oscillation of the sphere 136. In other words, they act as damping means.

Electromagnet 148-2 is controlled by adder 172-2. The inputs to adder 172-2 include a connection directly from potential source 175 and a connection from discriminator 171-1 connected from oscillator 170-1. Another input to adder 171-2 includes one from differentiator 173-1 which is connected from the output of discriminator 171-1. Still other inputs to adder 172-2 are provided from discriminators 171-3 and 171-4 and differentiators 173-3 and 173-4.

In the operation of the suspension control means shown in Fig. 13, should sphere 136 fall away from magnetic field producing means 140, including detector coil 149-1, the oscillation frequency of oscillator 170-1 may decrease. This decrease is converted into a direct-current voltage by discriminator 171-1 which is also differentiated by differentiator 173-1. The direct current to the magnetic field producing means 141, 142 and 143 containing electromagnets 148-2, 148-3 and 148-4 is then decreased by the decreased output of discriminator 171-1 and differentiator 173-1 since all three adders 172-2, 172-3 and 172-4 are connected thereto. Then the current to adders 172-2, 172-3 and 172-4 will decrease as will the current through coils 148-2, 148-3 and 148-4. This means that a relatively higher magnetic field will be produced by means 140 which will return ferromagnetic sphere 136 to its central location shown in Fig. 4. When the sphere 136 moves toward magnetic field producing means 140, the opposite will take place. The same is true for all the other magnetic field producing means 141, 142 and 143.

Figure 14:
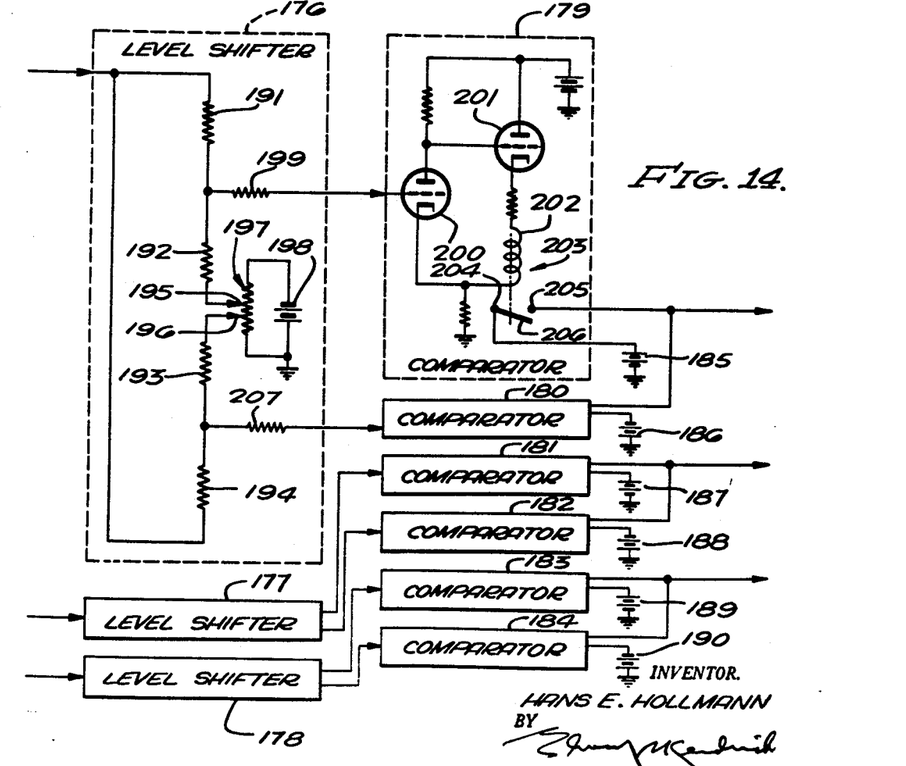
Fig. 14 is a schematic diagram of the other of the blocks shown in Fig. 12.

One embodiment of gimbal control means 169 is shown in Fig. 14 including level shifters 176, 177 and 178 for each of the three photocells 162 in position detector means 144, 145 and 146. A pair of comparators are provided for each of the level shifters, comparators 179, 180 for a level shifter 176; comparators 181, 182 for a level shifter 177; and comparators 183, 184 for level shifter 178. One comparator of each pair applies a positive voltage to a corresponding gimbal motor 124 and the other comparator of each pair applies a negative voltage to the corresponding gimbal motor 124 to slave hollow sphere 106 to a position of ferromagnetic sphere 136.

All level shifters 176, 177 and 178 may be identical. Hence, only level shifter 176 will be described. The comparators 179, 180, 181, 182, 183 and 184 may also be identical and for this reason only comparator 179 will be described in detail. Each of the comparators is provided with corresponding direct-current sources of potential 185, 186, 187, 188, 189 and 190. It is to be noted that sources of potential 185, 187 and 189 are connected to apply a positive direct-current voltage to corresponding gimbal motors 24 and sources of potential 186, 188 and 190 are connected to provide a negative direct-current voltage on corresponding gimbal motors 124.

Level shifter 176 simply includes means to shift the output voltage of corresponding photocell 162 positively and negatively to cause comparator 179 to connect direct-current source of potential 185 to a corresponding gimbal motor 124 when the input to level shifter 176 exceeds a predetermined threshold value and to cause comparator 180 to connect battery 186 to the same corresponding gimbal motor 124 when the input signal falls below a predetermined threshold value. All the comparators 179 are simply Schmidt trigger circuits. Level shifter 176 includes a pair of summing resistors 191 and 192 to add a reference potential appearing at a movable tap 195 on a potentiometer 197 supplied with direct-current voltage by a battery 198. The junction of resistors 191 and 192 are then connected to the input to Schmidt trigger circuit 179 through a resistor 199. Similarly, a second reference potential is provided at a movable tap 196 on potentiometer 197 and is added to the input to level shifter 176 by means of resistors 193 and 194 connected serially therewith. The junction of resistors 193 and 194 is then connected to comparator 180 through a resistor 207.

Schmidt trigger circuit 179 includes simply two triode amplifiers 200 and 201 with a relay 203 having a winding 202 connected serially in the cathode circuit of amplifier 201. Relay 203 is provided with a pole 204 having a contact arm 206 rotatably connected therefrom to make contact with a contact 205 of relay 203 upon energization of winding 202. Energization of winding 202 then connects the positive terminal of source of potential 185 to a corresponding gimbal motor 124.

It is to be noted that the pole 204 and contact 205 of a corresponding relay 203 and comparator 180 will be normally closed by corresponding arm 206 when that relay is deenergized. This means that a sufficiently positive voltage within the range of reference potentials appearing at movable taps 195 and 196 on potentiometer 197 in level shifter 176 must be provided to prevent energization of gimbal motor 124 corresponding to the level shifter 176.

Figure 15:
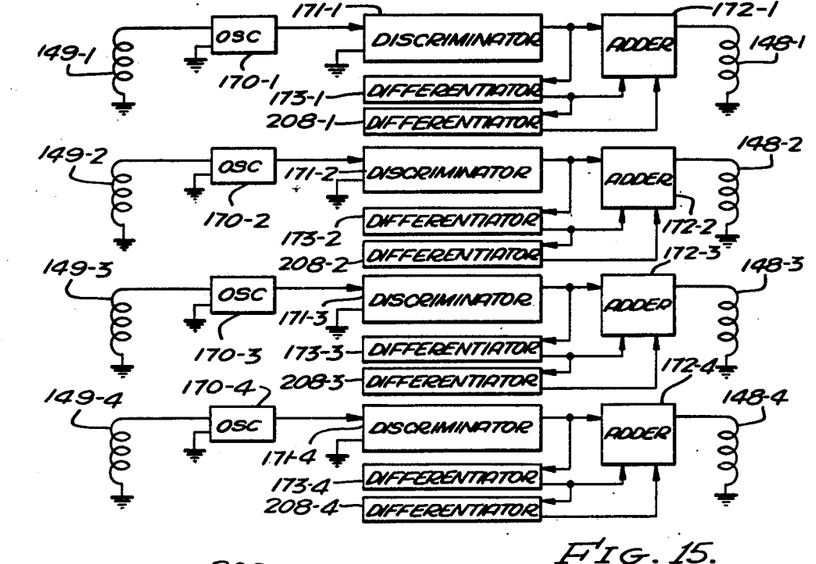
Fig. 15 is a schematic diagram of an alternative embodiment of control means shown in Fig. 13.

Alternative suspension control means may be provided as indicated in Fig. 15. All the component parts shown in Fig. 15 are also shown in Fig. 13. The component parts are simply connected in a different manner. Still further, differentiators 208–1, 208–2, 208–3, and 208–4 are additionally provided to improve the damping action that differentiators 173 provide. In the embodiment shown in Fig. 15, it is to be noted that detector coils 149–1 are employed to control directly the current flow to corresponding electromagnets 148–1. Thus, each adder 172 is supplied with outputs of corresponding discriminator 171 and differentiators 173 and 208. For this reason, only a current supply to electromagnet 148–1 will be explained. No direct-current potential source 175 is shown in Fig. 15 since discriminator 171 or differentiators 173 or 208 may be provided with suitable bias supplies to provide the same effect. In the operation of the embodiment shown in Fig. 5, should ferromagnetic sphere fall away from detector coil 149–1, the oscillation frequency of oscillator 170–1 may decrease. However, discriminator 171–1 may be adjusted in a manner such that its output will increase when the oscillation frequency of the output signal of oscillator 170–1 decreases. The output of discriminator 171–1 with the outputs of differentiators 173–1 and 208–1 are then impressed together upon adder 172–1, the input to differentiator 173–1 being provided at the output of discriminator 171–1 as before, and the input to differentiator 208–1 being provided from the output of differentiator 173–1. Adder 172–1 then increases current flow through electromagnet 148–1 to draw ferromagnetic sphere 136 closer to detector coil 149–1 until the error detected by discriminator 171–1 is reduced to zero.

Figures 16, 17, 18:
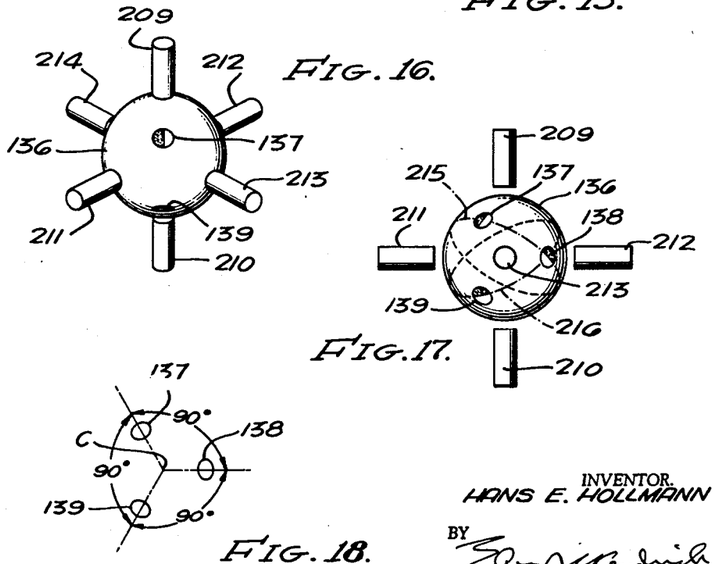
Fig. 16 is a perspective view of a ferromagnetic sphere with alternative support means therefor.
Fig. 17 is a side elevation view of the arrangement shown in Fig. 16.
Fig. 18 is a perspective view of spots on the sphere shown in Figs. 16 and 17 with their relative angular positions also being indicated.

In Fig. 16, alternate magnetic field producing means 209, 210, 211, 212, 213 and 214 are shown. It is to be noted that the longitudinal axes of field producing means 209 and 210 are identical. The same is true for the pairs 211, 212 and 213, 214. The symmetrical axes of each pair are orthogonal. It is to be noted that in this case, spots 137, 138 and 139 must be spaced from corresponding support means to prevent interference of the corresponding detector means 144, 145 and 146 which may be employed with the arrangement shown in Fig. 16. As shown in Fig. 17, the center of spots 137 and 138 lies on a great circle 215. Similarly, the centers of spots 138 and 139 lie on a great circle 216. The planes of great circles 215 and 216 are perpendicular. A third great circle also might be drawn through the centers of spots 137 and 139 although this has not been done for clarity. A plane of such a great circle would be perpendicular to the planes of great circles 215 and 216. Thus, spots 137 will be disposed 90 degrees apart in orthogonal planes as shown in Fig. 18. The center of the sphere 136 is labeled C in Fig. 18.

It is to be noted that only one diametrically opposed pair of field producing means shown in Fig. 16 need be employed with the invention if the magnetic field produced thereby is sufficiently high. However, for better stability, the three pairs shown in Fig. 16 may be employed. Separate control means for each pair of magnetic field producing means may be employed. The control circuit for each pair may be identical to that shown in Fig. 19 wherein diametrically opposite magnetic field producing means 217 and 218 are shown including ferromagnetic cores 219 and 222. Winding 220 is provided on magnetic core 219 and a winding 223 is provided on magnetic core 222. An additional winding 224 is also provided on core 222 which is energized by a battery 225 through a switch 226. It is to be understood that in connection with the control circuit shown in Fig. 19, the magnetic field produced by coil 224 always exceeds that produced by coil 223. Coils 223 and 224 are also connected in magnetomotive force bucking relation. This means that an increase in current through coil 223 ultimately produces an overall decrease in the magnetomotive force provided by magnetic field producing means 218. Magnetic field producing means 218 may also have a detector coil 221 mechanically fixed in it to detect movement from magnetic sphere 136. Detector coil 221 is connected from an alternating voltage source 232 to an inductor coil 233 and a diode 234. Diode 234 is connected to a grid 230 of triode 228 having an anode 229 and a cathode 231. Resistor 236 and a battery 235 are connected serially from grid 230 to cathode 231. The same is true of a smoothing capacitor 237. Battery 235 simply provides back bias for the triode 228. An anode source of potential 227 is connected from cathode 231 to coil 223.

Figure 9:
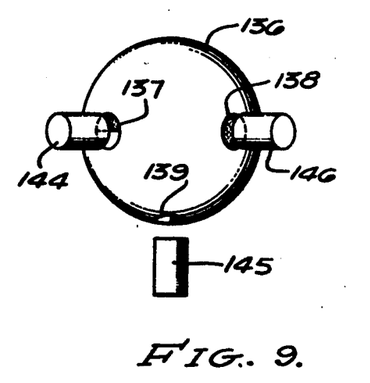
Fig. 9 is a front elevational view of the ferromagnetic sphere with means shown to detect its rotational movement about orthogonal axes.

During the operation of the control circuit shown in Fig. 9, if ferromagnetic sphere 236 moves downwardly too close to detector coil 221, its inductance will increase. In this case, the potential of grid 230 will increase positively. Thus, triode 220 will conduct more heavily and an increased upwardly directed force will be provided by magnetic field producing means 270 through increased current flow in coil 220. This will draw ferromagnetic sphere 136 upwardly toward it to compensate for its downward movement. Simultaneously, current in coil 223 will also be increased. However, due to the fact that the magnetomotive force produced by field producing means 118 is inverse to current to coil 223, a smaller force of attraction will be provided by magnetic field producing means 218 to permit ferromagnetic sphere 136 to be drawn upwardly by the increased current flow to magnetic field producing means 217. When ferromagnetic sphere 136 rises upwardly, the converse is true for the operation of both magnetic field producing means 217 and 218.

Figures 19, 20, 21:
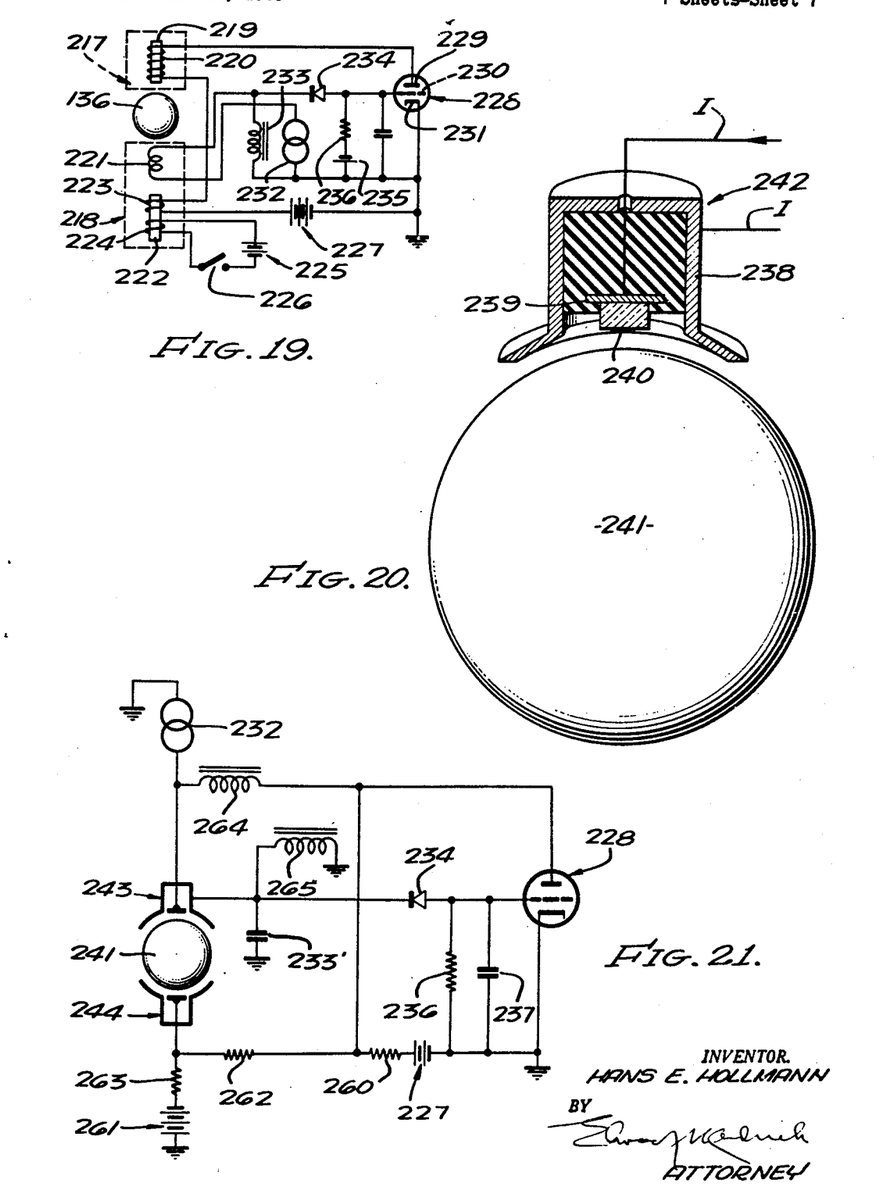
Fig. 19 is a schematic diagram of an arrangement for controlling the support means shown in Figs. 16 and 17.
Fig. 20 is a perspective view of an alternative support system for a sphere.
Fig. 21 is a schematic diagram of an alternative control circuit of the invention.

In Fig. 20, alternate field producing means is shown including electric field producing means 242 and a conductive shield 238 having a conductive disc 239 mounted in insulated relation internally thereof with a piezoelectric crystal 240 fixed thereto. In this case, a dielectric sphere 241 is employed with the invention which is held in position by a voltage applied to electrodes 238 and 239, respectively. As before, only two electric field producing means 242 need be employed with the invention although four or six may be used in the same manner as magnetic field producing means shown in Figs. 6 and 16.

A control circuit similar to the control circuit shown in Fig. 19 may be employed for diametrically opposite pair of field producing means as indicated in Fig. 21.

A control circuit for diametrically opposite electrostatic field producing means is shown in Fig. 21. It is to be noted that diode 234, resistor 236, capacitor 237 and triode 228 may be employed as before. An anode resistor 260 is additionally employed with anode battery 227. A battery 261 is also employed with summing resistors 262 and 263 to operate as negative bias means in exactly the same manner as battery 225 produces an overwhelming magnetic field in core 222 by supplying current to coil 224. Source 232 supplies an alternating voltage as before. Two alternating current chokes are provided at 264 and 265. Control is based upon a change in capacitance between the electrodes of electrostatic field producing means being indicated at 244. The capacitance between the electrodes of field producing means 243 is then compared with the capacitance of a fixed capacitor 233' corresponding to inductor 233 shown in Fig. 19. Bias battery 235 has been eliminated as unnecessary.

Although only a few specific embodiments of the invention have been shown and described, many changes and modifications will of course suggest themselves to those skilled in the art. The invention is thus not to be limited to the embodiments illustrated, the true scope of the invention being defined only in the appended claims.

What is claimed is:

1. A position indicator comprising: a spherical body; and at least four separately operable electronic means for producing four corersponding vector forces in different directions to attract said body, said body being made of a material to be attracted by said electronic means, three of said electronic means being positioned approximately in a single plane spaced from the center of said body in a predetermined direction therefrom, the fourth of said means being positioned approximtaely in a plane parallel to said single plane but spaced from the center of said body in a direction opposite said predetermined direction, said electronic means being controllable to suspend said body in spaced relation thereto without physical contact therewith.

2. A position indicator comprising: a spherical body; and at least four separately operable electronic means for producing a field to link said body to attract it in different directions, said body being made of a material to be attracted by said field producing means, three of said field producing means being positioned approximately in a single plane spaced from the center of said body in a predetermined direction therefrom, the fourth of said field producing means being positioned approximately in a plane parallel to said single plane but spaced from the center of said body in a direction opposite said predetermined direction, said field producing means being controllable to suspend said body in spaced relation thereto without physical contact therewith.

3. A position indicator comprising: a spherical ferromagnetic body; and at least four separately operable electronic means for producing a magnetic field to link said body to attract it in different directions, three of said magnetic field producing means being positioned approximately in a single plane spaced from the center of said body in a predetermined direction therefrom, the fourth of said magnetic field producing means being positioned approximately in a plane parallel to said single plane but spaced from the center of said body in a direction opposite said predetermined direction, said magnetic field producing means being controllable to suspend said body in spaced relation thereto without physical contact therewith.

4. A position indicator comprising: a spherical dielectric body; and at least four separately electronic means for producing an electric field to link said body to attract it in different directions, three of said electric field producing means being positioned approximately in a single plane spaced from the center of said body in a predetermined direction therefrom, the fourth of said electric field producing means being positioned approximately in a plane parallel to said single plane but spaced from the center of said body in a direction opposite said predetermined direction, said electric field producing means being controllable to suspend said body in spaced relation thereto without physical contact therewith.

5. A position indicator comprising: a spherical body; at least four separately operable electronic means for producing corresponding different vector forces to attract said body, said body being made of a material to be attracted by said electronic means, three of said electronic means being positioned approximately in a single plane spaced from the center of said body in a predetermined direction therefrom, the fourth of said means being positioned approximately in a plane parallel to said single plane but spaced from the center of said body in a direction opposite said predetermined direction, said electronic means being controllable to suspend said body in spaced relation thereto without physical contact therewith; support means for said electronic means; and means to indicate the r tational position of said body relative to said support means.

6. A position indicator comprising: a spherical ferromagnetic body made of a ferrite material; at least four separately operable electronic means for producing a magnetic field to link said body to attract it in different directions, three of said magnetic field producing means being positioned approximately in a single plane spaced from the center of said body in a predetermined direction therefrom, the fourth of said magnetic field producing means being positioned approximaely in a plane parallel to said single plane but spaced from the center of said body in a direction opposite said predetermined direction, said magnetic field producing means being controllable to suspend said body in spaced relation thereto without physical contact therewith; support means for said electronic means; and means to indicate the rotational position of said body relative to said support means.

7. A position indicator comprising: a spherical ferromagnetic body made of a ferrite material; at least four separately operable electronic means for producing a magnetic field to link said body to attract it in different directions, three of said magnetic field producing means being positioned approximately in a single plane spaced from the center of said body in a predetermined direction therefrom, the fourth of said magnetic field producing means being positioned approximately in a plane parallel to said single plane but spaced from the center of said body in a direction opposite said predetermined direction, said magnetic field producing means being controllable to suspend said body in spaced relation thereto without physical contact therewith; support means for said electronic means; and means to indicate the rotational position of said body relative to said support means.

8. A position indicator comprising: housing means providing an evacuated chamber; a spherical body; and at least four separately operable electronic means supported by said housing means in said chamber for producing corresponding different vector forces to attract said body, said body being made of a material to be attracted by said electronic means, three of said electronic means being positioned approximately in a single plane spaced from the center of said body in a predetermined direction therefrom, the fourth of said means being positioned approximately in a plane parallel to said single plane but spaced from the center of said body in a direction opposite said predetermined direction, said electronic means being controllable to suspend said body in spaced relation thereto without physical contact therewith.

9. A position indicator comprising: housing means providing an evacuated chamber; a spherical body; at least four separately operable electronic means supported from said housing means in said chamber for producing corresponding different vector forces to attract said body, said body being made of a material to be attracted by said electronic means, three of said electronic means being positioned approximately in a single plane spaced from the center of said body in a predetermined direction therefrom, the fourth of said means being positioned approximately in a plane parallel to said single plane but spaced from the center of said body in a direction opposite said predetermined direction, said electronic means being controllable to suspend said body in spaced relation thereto without physical contact therewith; and means to indicate the rotational position of said body relative to said housing means.

10. A position indicator comprising: housing means to provide an evacuated chamber; a spherical ferromagnetic body; at least four separately operable electronic means for producing magnetic fields linking said body to attract it, three of said electronic means being positioned approximately in a single plane spaced from the center of said body in a predetermined direction therefrom, the fourth of said means being positioned approximately in a plane parallel to said single plane but spaced from the center of said body in a direction opposite said predetermined direction, said means being controllable to suspend said body in spaced relation thereto without physical contact therewith; and means to indicate the rotational position of said body relative to said housing means.

11. A position indicator comprising: support means; an outer framework; outer gimbal means to support said framework from said support means rotatably about a first axis; an intermediate framework; intermediate gimbal means to support said intermediate framework from said outer framework rotatably about a second and different axis; an inner framework; inner gimbal means to support said inner framework from said intermediate framework rotatably about a third and different axis; a spherical body; at least four separately operable electronic means fixed to said inner framework for producing corresponding vector forces to attract said body, said body being made of a material to be attracted by said means, three of said electronic means being positioned approximately in a single plane spaced from the center of said body in a predetermined direction therefrom, the fourth of said electronic means being positioned approximately in a plane parallel to said single plane but spaced from the center of said body in a direction opposite said predetermined direction, said electronic means being controllable to suspend said body in spaced relation thereto within said inner framework without physical contact with either said electronic means or said inner framework; means also on said inner framework spaced from said body to detect rotation of said inner framework in three different directions relative to said body; and servo means responsive to the output of said detection means for rotating said frameworks in a manner to reduce said relative rotation to zero, whereby the positions of said frameworks relative to support means will represent rotational movement of said support means in space relative to said body.

12. A position indicator comprising: housing means to provide an evacuated chamber; an outer framework; outer gimbal means to support said outer framework from said housing means within said chamber rotatably about a first axis; an intermediate framework; intermediate gimbal means to support said intermediate framework from said outer framework rotatably about a second axis perpendicular to said first axis; an inner framework; inner gimbal means to support said inner framework from said intermediate framework rotatably about a third axis perpendicular to said second axis; a spherical body; at least four separately operable electronic means on said inner framework for producing corresponding vector forces to attract said body, said body being made of a material to be attracted by said means, three of said electronic means being positioned approximately in a single plane spaced from the center of said body in a predetermined direction therefrom, the fourth of said electronic means being positioned approximately in a plane parallel to said single plane but spaced from the center of said body in a direction opposite said predetermined direction, said electronic means being controllable to suspend said body is spaced relation thereto within said inner framework without physical contact with either said electronic means or said inner framework; means also on said inner framework spaced from said body to detect rotation of said inner framework in three different directions relative to said body; and servo means responsive to the output of said detection means for rotating said frameworks in a manner to reduce said relative rotation to zero, whereby the positions of said frameworks relative to support means will represent rotational movement of said support means in space relative to said body.

13. A position indicator comprising: support means; an outer framework; an outer gimbal means to support said framework from said support means rotatably about a first axis; an intermediate framework; intermediate gimbal means to support said intermediate framework from said outer framework rotatably about a second axis perpendicular to said first axis; an inner framework; inner gimbal means to support said inner framework from said intermediate framework rotatably about a third axis perpendicular to said second axis; a spherical ferromagnetic body; at least four separately operable electronic means on said inner framework for producing four magnetic fields to link said body at different positions therearound and thereby to provide a force of attraction to said body, three of said electronic means being positioned approximately in a single plane spaced from the center of said body in a predetermined direction therefrom, the fourth of said electronic means being positioned approximately in a plane parallel to said single plane but spaced from the center of said body in a direction opposite said predetermined direction, said electronic means being controllable to suspend said body in spaced relation thereto within said inner framework without physical contact with either said electronic means or said inner framework; means also on said inner framework spaced from said body to detect rotation of said inner framework in three different directions relative to said body; and servo means responsive to the output of said detection means for rotating said frameworks in a manner to reduce said relative rotation to zero, whereby the positions of said frameworks relative to support means will represent rotational movement of said support means in space relative to said body.

14. A position indicator comprising: housing means to provide an evacuated chamber; an outer framework; outer gimbal means to support said outer framework from said housing means within said chamber rotatably about a first axis; an intermediate framework; intermediate gimbal means to support said intermediate framework from said outer framework rotatably about a second axis perpendicular to said first axis; an inner framework; inner gimbal means to support said inner framework from said intermediate framework rotatably about a third axis perpendicular to said second axis; a spherical ferromagnetic body; at least four separately operable electronic means on said inner framework for producing four magnetic fields to link said body at different positions therearound and thereby to provide a force of attraction to said body, three of said electronic means being positioned approximately in a single plane spaced from the center of said body in a predetermined direction therefrom, the fourth of said electronic means being positioned approximately in a plane parallel to said single plane but spaced from the center of said body in a direction opposite said predetermined direction, said electronic means being controllable to suspend said body in spaced relation thereto within said inner framework without physical contact with either said electronic means or said inner framework; means also on said inner framework spaced from said body to detect rotation of said inner framework in three different directions relative to said body; and servo means responsive to the output of said detection means for rotating said frameworks in a manner to reduce said relative rotation to zero, whereby the positions of said frameworks relative to support means will represent rotational movement of said support means in space relative to said body.

15. A position indicator comprising: housing means to provide an evacuated chamber; an outer framework; outer gimbal means to support said outer framework from said housing means within said chamber rotatably about a first axis; an intermediate framework; intermediate gimbal means to support said intermediate framework from said outer framework rotatably about a second axis perpendicular to said first axis; an inner framework; inner gimbal means to support said inner framework from said intermediate framework about a third axis perpendicular to said second axis; a spherical ferromagnetic body; at least four electromagnets on said inner framework for producing magnetic fields linking said body at four corresponding positions around said body to attract it, three of said electromagnets being positioned approximately in a single plane spaced from the center of said body in a predetermined direction therefrom, the fourth electromagnet being positioned approximately in a plane parallel to said single plane but spaced from the center of said body in a direction opposite said predetermined direction; translation detector means including an inductive winding at the position of each of said electromagnets spaced from said body for producing an output signal proportional to the distance of said body from each corresponding electromagnet; means for producing rate signals proportional to the rate of change of said translation detector means output signals with respect to time; means for controlling electric current flow to said electromagnets in accordance with said translation detector means, output signals and said rate signals to maintain the center of said body in a substantially fixed position relative to said inner framework in spaced relation to said electromagnets without physical contact therewith; rotation detector means also on said inner framework spaced from said body to detect relative rotation of said inner framework relative to said body about three mutually perpendicular axes through the center of said body; and servo means responsive to the output of said rotation detector means for rotating said framework in a manner to reduce said relative rotation to zero, whereby the positions of said frameworks relative to said housing means will represent the amount of rotational movement of said housing means around said body.

16. A position indicator comprising: housing means to provide an evacuated chamber; an outer framework; outer gimbal means to support said outer framework from said housing means within said chamber rotatably about a first axis; an intermediate framework; intermediate gimbal means to support said intermediate framework from said outer framework rotatably about a second axis perpendicular to said first axis; an inner framework; inner gimbal means to support said inner framework from said intermediate framework rotatably about a third axis perpendicular to said second axis; a spherical ferromagnetic body; at least four separately operable electronic means on said inner framework for producing four magnetic fields to link said body at different positions therearound and thereby to provide a force of attraction to said body, three of said electronic means being positioned approximately in a single plane spaced from the center of said body in a predetermined direction therefrom, the fourth of said electronic means being positioned approximately in a plane parallel to said single plane but spaced from the center of said body in a direction opposite said predetermined direction, said electronic means being controllable to suspend said body in spaced relation thereto within said inner framework without physical contact with either said electronic means or said inner framework, said body having three sets of adjacent and light colored areas having dividing lines on great circles lying in mutually perpendicular planes; means to illuminate said areas; three photocells spaced from said body and carried on said inner framework at the positions of said black and white areas to produce output signals in accordance with rotational movement of said inner framework relative to said body about axes through the center of said body perpendicular to the planes of said great circles; and servo means responsive to the output signals of said photocells for rotating corresponding frameworks to reduce said relative rotation to zero.

17. A position indicator comprising: housing means to provide an evacuated chamber: an outer framework; outer gimbal means to support said outer framework from said housing means within said chamber rotatably about a first axis; an intermediate framework; intermediate gimbal means to support said intermediate framework from said outer framework rotatably about a second axis perpendicular to said first axis; an inner framework; inner gimbal means to support said inner framework from said intermediate framework about a third axis perpendicular to said second axis; a spherical ferromagnetic body; at least four electromagnets on said inner framework for producing magnetic fields linking said body at four corresponding positions around said body to attract it, three of said electromagnets being positioned approximately in a single plane spaced from the center of said body in a predetermined direction therefrom, the fourth electromagnet being positioned approximately in a plane parallel to said single plane but spaced from the center of said body in a direction opposite said predetermined direction, said three electromagnets being located at angles of 120 degrees apart in said single plane about a line through the center of said body perpendicular to said single plane, said fourth electromagnet being located at an angle of 120 degrees from each of said three electromagnets; translation detector means including an inductive winding at the position of each of said electromagnets spaced from said body for producing an output signal proportional to the distance of said body from each corresponding electromagnet; means for controlling electric current flow to each of said electromagnets in accordance with the inductive windings associated with the other three electromagnets to maintain the center of said body in a substantially fixed position relative to said inner framework in spaced relation to said electromagnets without physical contact therewith; rotation detector means also on said inner framework spaced from said body to detect relative rotation of said inner framework relative to said body about three mutually perpendicular axes through the center of said body; and servo means responsive to the output of said rotation detector means for rotating said framework in a manner to reduce said relative rotation to zero, whereby the positions of said frameworks relative to said housing means will represent the amount of rotational movement of said housing means around said body.

18. A position indicator comprising: housing means to provide an evacuated chamber; an outer framework; outer gimbal means to support said outer framework from said housing means within said chamber rotatably about a first axis; an intermediate framework; intermediate gimbal means to support said intermediate framework from said outer framework rotatably about a second axis perpendicular to said first axis; an inner framework; inner gimbal means to support said inner framework from said intermediate framework rotatably about a third axis perpendicular to said second axis; a spherical ferromagnetic body; three pairs of electromagnets disposed at three different pairs of diametrically opposite points around said body lying in corresponding mutually perpendicular lines for producing magnetic fields linking said body to attract it; translation detector means including an inductive winding at the position of one of each of said pairs of planes spaced from said body for producing output signals proportional to the respective distances of said body from each corresponding electromagnet; servo means responsive to the output signals of said translation detector means for each of said pairs of electromagnets for increasing current flow to one electromagnet of a pair and for decreasing current flow to the other electromagnet of said pair on movement of said body away from said one electromagnet toward said other electromagnet; rotation detector means also on said inner framework spaced from said body to detect rotation of said inner framework relative to said body about three mutually perpendicular axes through the center of said body; and servo means responsive to the output of said rotation detector means for rotating said framework in a manner to reduce said relative rotation to zero, whereby the positions of said frameworks relative to said housing means will represent the amount of rotational movement of said housing means around said body.

19. A position indicator comprising: a spherical ferromagnetic body; at least two separately operable electronic means for producing magnetic fields linking said body at diametrically opposite points therearound to attract said body; means to produce an output signal proportional to the position of said body along a line through said diametrically opposite points; means responsive to said detector means output signal for changing electric current flow at least to one of said electronic means when said body moves from a central position in a manner to maintain said body in a substantially fixed position relative to said electronic means spaced therefrom without physical contact therewith; a base; gimbal support means on said base for said electronic means; means to detect rotational movement of said body relative to said base; and servo means responsive to the output of said detector means to rotate said gimbal support means in a manner to follow rotation of said body.

20. A position indicator comprising: housing means to provide an evacuated chamber; an outer framework; outer gimbal means to support said outer framework from said housing means within said chamber rotatably about a first axis; an intermediate framework; intermediate gimbal means to support said intermediate framework from said outer framework rotatably about a second axis perpendicular to said first axis; an inner framework; inner gimbal means to support said inner framework from said intermediate framework rotatably about a third axis perpendicular to said second axis; a spherical ferromagnetic body; two electromagnets at two diametrically opposite points around said body for producing magnetic fields linking said body to attract it; translation detector means including an inductive winding at the position of one of each of said pairs of planes spaced from said body for producing output signals proportional to the respective distances of said body from each corresponding electromagnet; servo means responsive to the output signals of said translation detector means for each of said electromagnets for increasing current flow to one electromagnet of a pair and for decreasing current flow to the other electromagnet of said pair on movement of said body away from said one electromagnet toward said other electromagnet; rotation detector means also on said inner framework spaced from said body to detect rotation of said inner framework relative to said body about three mutually perpendicular axes through the center of said body; and servo means responsive to the output of said rotation detector means for rotating said framework in a manner to reduce said relative rotation to zero, whereby the positions of said frameworks relative to said housing means will represent the amount of rotational movement of said housing around said body.

References Cited in the file of this patent
UNITED STATES PATENTS

| | | |
|---|---|---|
| 2,562,690 | Becker | July 21, 1951 |
| 2,691,306 | Beams et al. | Oct. 12, 1954 |
| 2,785,573 | Bently | Mar. 19, 1957 |
| 2,879,669 | Stotsinger | Mar. 31, 1959 |

UNITED STATES PATENT OFFICE
CERTIFICATE OF CORRECTION

June 28, 1960

Patent No. 2,942,479

Hans E. Hollmann

It is hereby certified that error appears in the printed specification of the above numbered patent requiring correction and that the said Letters Patent should read as corrected below.

Column 1, line 55, after "rotational" insert -- position --; column 5, line 37, for "accelerator" read -- accelerometer --; column 7, line 62, after "sphere" insert -- 136 --; column 8, line 59, for "236" read -- 136 --; column 10, line 48, for "approximaely" read -- approximately --.

Signed and sealed this 13th day of December 1960.

(SEAL)
Attest:

KARL H. AXLINE
Attesting Officer

ROBERT C. WATSON
Commissioner of Patents